United States Patent [19]
Baumann

[11] 3,827,130
[45] Aug. 6, 1974

[54] METHOD OF MAKING THERMOPLASTIC LINED METAL BODIES

[75] Inventor: Bernard Baumann, Paris, France

[73] Assignee: CEGEDUR Societe de Transformation de l'Aluminium PECHINEY, Paris, France

[22] Filed: June 25, 1973

[21] Appl. No.: 372,961

Related U.S. Application Data

[62] Division of Ser. No. 73,446, Sept. 18, 1970, Pat. No. 3,794,203.

[52] U.S. Cl............... 29/421, 156/212, 156/218, 264/90, 264/267, 264/269, 264/292
[51] Int. Cl............................................. B23p 17/00
[58] Field of Search ......... 29/421; 264/292, 88, 90, 264/92, 267, 269, 316, 338; 156/212, 218

[56] References Cited
UNITED STATES PATENTS

| | | | |
|---|---|---|---|
| 2,660,761 | 12/1953 | Peters | 264/292 X |
| 2,852,328 | 9/1958 | Jewell et al. | 264/90 X |
| 3,068,561 | 12/1962 | Jones | 29/421 X |
| 3,383,026 | 5/1968 | McGee | 220/63 R X |
| 3,453,162 | 7/1969 | Turner | 264/90 X |
| 3,566,650 | 3/1971 | Johnson | 29/421 X |
| 3,765,976 | 10/1973 | Nasica | 265/90 X |

FOREIGN PATENTS OR APPLICATIONS

| 137,843 | 4/1948 | Australia | 29/421 |

Primary Examiner—Charles W. Lanham
Assistant Examiner—Victor A. DiPalma
Attorney, Agent, or Firm—McDougall, Hersh & Scott

[57] ABSTRACT

Fuel tank and other hollow metal bodies internally lined with a thermoplastic material wherein a heated sheet of the thermoplastic material is laid over the previously formed hollow metal body with the plastic sheet in engagement with the edge of said body and the sheet is deformed to correspond to the internal shape of said body by drawing a vacuum through a foramenous vacuum tubing which remains entrapped between said sheet and body to become a part thereof and which includes the addition of porous and permeable bodies connected to the vacuum system for formation of said sheet liner with sections which extend from the metal body, and fuel tanks formed by the joinder of such lined body portions in sealed relation along the meeting edges of the plastic lining.

5 Claims, 18 Drawing Figures

3,827,130

METHOD OF MAKING THERMOPLASTIC LINED METAL BODIES

This is a division of application U.S. Ser. No. 73,446, filed Sept. 18, 1970 now U.S. Pat. No. 3,794,203.

This invention relates to metal bodies internally lined with thermoplastic film or sheet material and to the method for producing same and more particularly to fuel tanks or other hollow bodies produced by same. The invention is of particular interest to the art of forming plastic materials to desired shapes and to containers for shipment by rail, truck, river or boat.

It is known in the prior art to produce composite structures having an outer metal layer and an inner plastic lining by first forming a metal sheet to desired shape, as by stamping, then deforming a heated thermoplastic sheet by use of the stamped metal sheet as a matrix. The heat shaping is usually achieved by creating a vacuum between the metal sheet and the plastic sheet through perforations extending through the metal sheet.

This method is encumbered by the need to drill vacuum opening with coresponding weakening of the metal component, increase in cost of production, and reduction in esthetic appearance.

It is an object of this invention to provide a new and improved method and means for production of metal bodies internally lined with thermoplastic material in which the production can be achieved in an efficient and economical manner without weakening or disfiguring the metal body and it is a related object to produce internally lined hollow bodies and more particularly internally lined fuel tanks.

These and other objects and advantages of this invention will hereinafter appear, and for purposes of illustration, but not of limitation, embodiments of this invention are shown in the accompanying drawings, in which.

In accordance with the practice of this invention, the shaped metal body is first formed, a plastic sheet is placed on said body and deformed by heat in response to a vacuum provided in the space between both elements by means of a disposable vacuum tube with lateral openings located between both elements.

In a particular embodiment of this invention whereby it becomes possible to obtain positive stamping elements of the thermoplastic sheet, at least one intermediate porous and permeable body, such as a drilled profile or a block of thermosetting foam with open pores, is interposed in the desired location between both elements and connected to the vacuum tube circuit.

Figure 1:
FIG. 1 is a sectional elevational view of a sheet of thermoplastic material of the type employed in the practice of this invention.
Figure 2:
FIG. 2 is a sectional elevational view of an intermediate porous and permeable body.
Figure 3:
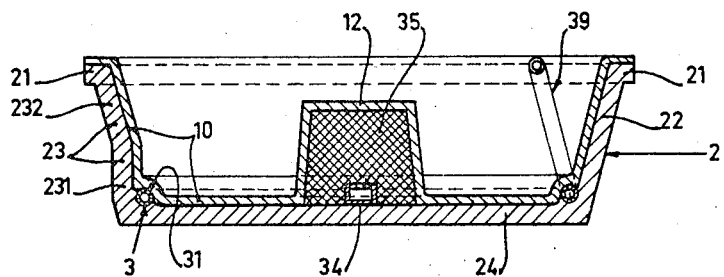
FIG. 3 is a sectional elevational view of an assembly of a shaped metal body with the elements of FIGS. 1 and 2.

Referring now to the drawings, the hollow body shown in FIG. 3 is obtained by stamping or molding a metal sheet to the shape of the hollow body 2. The hollow body is spanned by a preheated thermoplastic sheet 1, such as polyethylane, which engages the edges 21 of the hollow body after which a vacuum is drawn between the sheet 1 and the hollow metal body 2.

The vacuum is formed by means of a vacuum tube 3 having perforations 31. The vacuum tube 3 is located on the bottom of the hollow body and connected by tubing 39 to a vacuum source, such as a vacuum pump. Under the effect of atmospheric pressure, outside the sheet, the latter is caused to deform as it is drawn down to conform to the inner wall of the hollow body to form a thermoplastic layer 10 lining the metal body. The sheet 1 or the inner surface of the hollow body or both may be coated with an adhesive to effect interbonding of the adjacent surfaces as the sheet is drawn into contact with the inner surfaces of the hollow metal body. Use is no longer made of the vacuum tube 3 since it becomes a part of the final assembly.

It will be noted that the side wall 22 of the hollow body has a certain skin, while the opposite wall 23 is formed with two zones, including a lower zone 231 which has no skin and an upper zone 232 which has a skin. In fact, the hollow body may have zones without skin.

If the thermoplastic layer is to have a positive stamping member or intermediate projecting portion 12, an intermediate porous and permeable body 35 is interposed into the vacuum tube circuit 3 at the desired location, traversed by a branch 34 of the vacuum tube. This intermediate body may, for example, be in the form of a block of a heat hardenable foamed copolymer having open pores, a metal profile, or a perforate plastic material. In the latter cases, the profile itself may form a branch of the vacuum tube.

When the vacuum is drawn through tube 3, the thermoplastic sheet is deformed and drawn to form the positive member 12 about the intermediate body 35.

Figure 4:
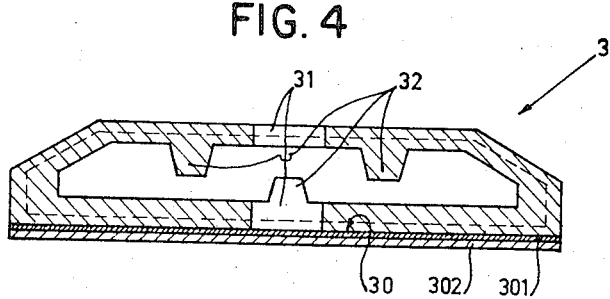
FIG. 4 is a sectional view taken along the line A—A of FIG. 5.
Figure 5:
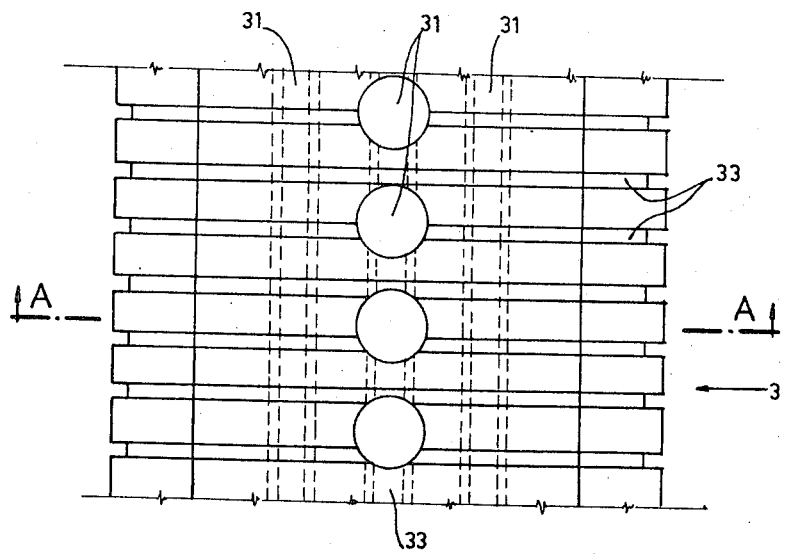
FIG. 5 is a plan view of a vacuum tube employed in the practice of this invention.
Figure 6:
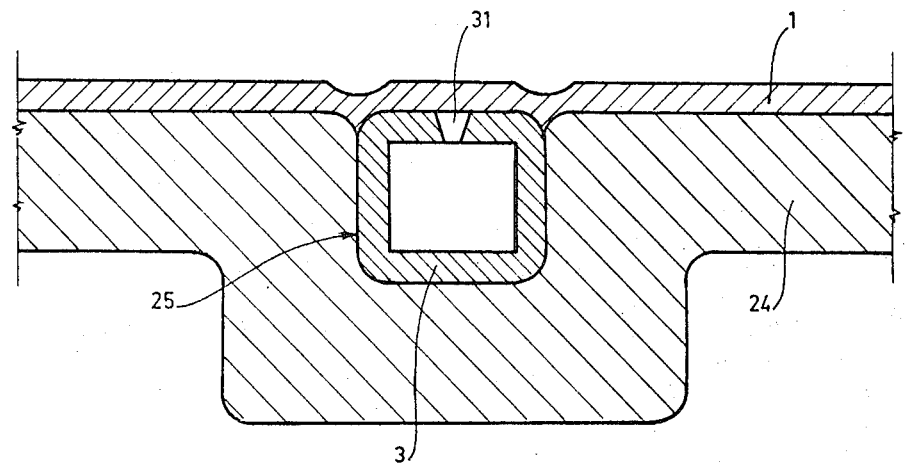
FIG. 6 is a sectional elevational view of a portion of the assembly showing the vacuum tube located in a groove in the hollow metal body.
Figure 7:
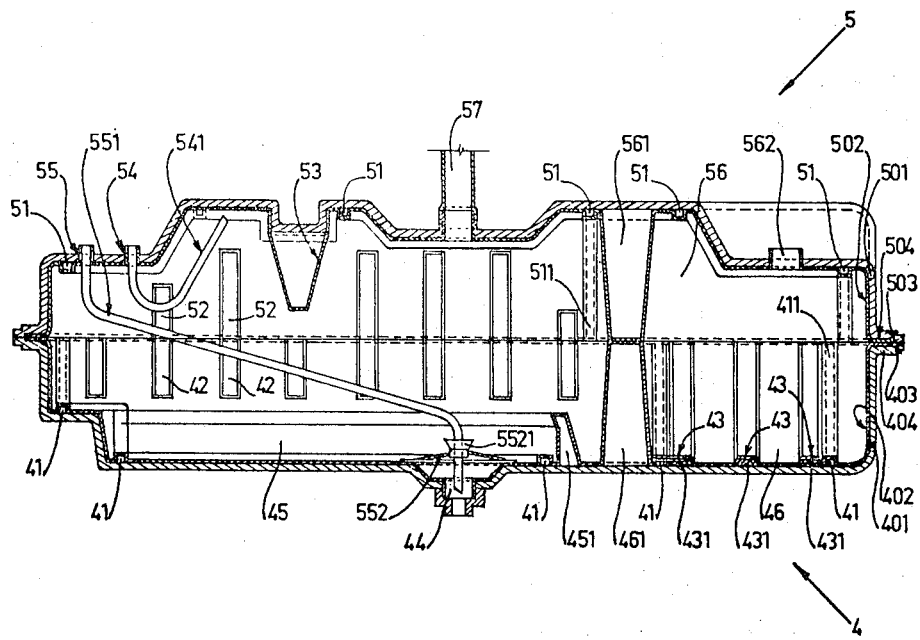
FIG. 7 is a sectional elevational view of a fuel tank prepared in accordance with the practice of this invention.
Figure 8:
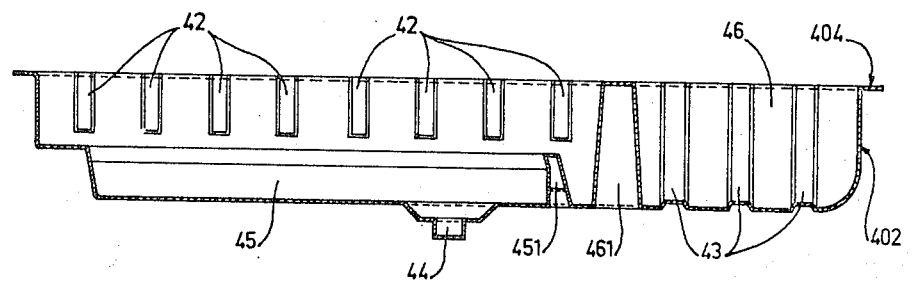
FIG. 8 is a sectional elevational view showing the heat formed thermoplastic sheet of the lower shell.
Figure 9:
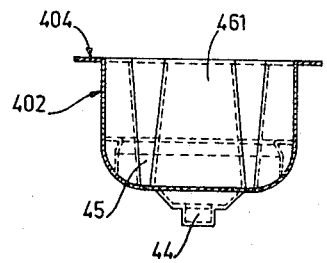
FIG. 9 is a cross section of the formed sheet shown in FIG. 8.
Figure 10:
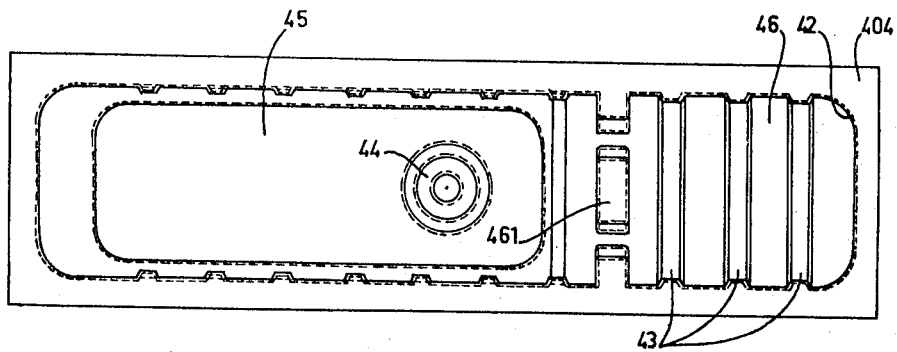
FIG. 10 is a top plan view of the formed sheet of FIG. 8.
Figure 11:
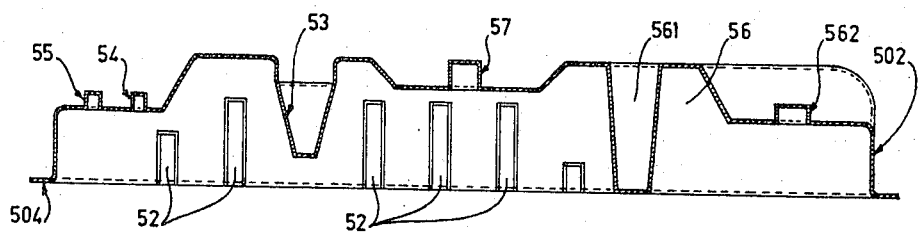
FIG. 11 is a view similar to that of FIG. 8 of the heat formed sheet of the upper shell.
Figure 12:
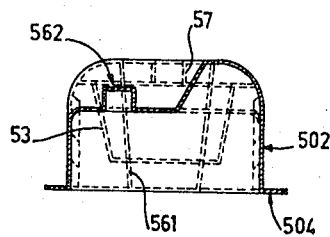
FIG. 12 is a cross section of the sheet shown in FIG. 11.
Figure 13:
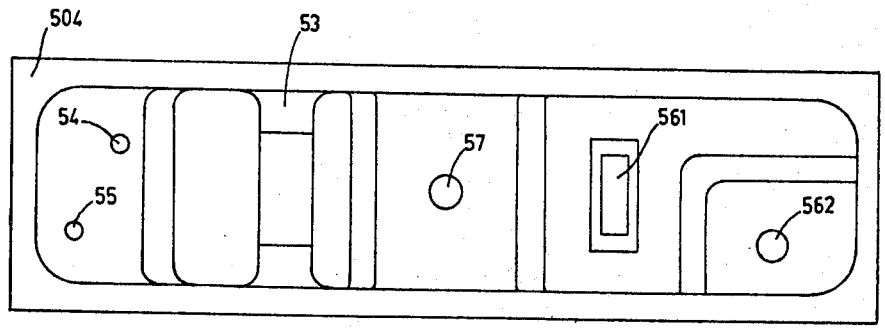
FIG. 13 is a plan view of the formed sheet of FIG. 11.

The vacuum tube 3 may be of various types. It can be circular in cross section, as shown in FIG. 3, or rectangular as shown in FIG. 6, or it can have a flattened portion with inter grooves 32 which prevent collapse, as shown in FIGS. 4 and 5, or it can be formed with curved surfaces. The tube can be fabricated of rigid or flexible metal or plastic tubing.

The tube may be formed with channels 33 into which the thermoplastic sheet 1 can penetrate. Further, it can have a plane surface 30 which is coatable with an adhesive 301, protected by a removable cover sheet 302, by virtue of the channeling 33, when this tube is laid.

It is possible to provide grooves 25 in the inner walls of the hollow metal body 2, and particularly in the bottom of the latter, as at 24, and locate the vacuum tube 3 therein, as shown in FIG. 6.

The vacuum tube also may extend to the outside through the surface of a joint through an orifice provided in the wall, which serves as a passage of a tubular member forming part of the hollow body. It is then immobilized between the metal wall and the tubular member.

In the manner described, a hollow body is obtained which combines the advantages of the mechanical strength of metals with the advantages of resistance to corrosion and sound insulation of the plastic component.

This technique is particularly appropriate for building fuel tanks for railway vehicles or trucks. For this purpose two hollow bodies analogous to that just described are then used; they are sealed edge to edge in order to form a completely closed tank.

In the illustrated modification, the tank comprises a lower member 4 and an upper member 5.

The lower member comprises a metal shell 401 formed, as by stamping to the desired shape, a thermoplastic sheet 402, such as a high density polyethylene, heatshaped therein by means of vacuum tubes 41 comprising one or several connections 411 with at least one vacuum source. Rigidification or stiffening members 42 are provided where the plastic is joined with the metal, and stiffening members 43 where the plastic is separated from the metal by an intermediate body 431 of plastic foam having connected pores.

The upper member, may or may not be symmetrical in some details, with the lower shell. It also comprises a metal shell 501 in which a thermoplastic sheet 502 is heatshaped by means of vacuum tubes 51 comprising one or several fittings 511 communicating with at least one vacuum source. Stiffening members 52 are provided and placed into the extension of the members 42.

The members 4 and 5 include a number of accessories. The lower member 4 embodies the drainage tube 44 serving as a sump, the emergency fuel tank 45 separated by a plastic wall 451 formed in the thermoplastic sheet 402 at the time of the deformation under the effect of the vacuum, thanks to a porous member with communicating pores (not shown), a lower part 46 in the form of a tranquilization vat, separated by a wall 461. The upper member 5 has a tubing 57 for feeding the tank with fuel, an upper part 56 of the tranquilization vat, separated by the wall 561, extending the wall 461 provided with a manhole 562 which can accommodate a fuel gauge (not shown), tranquilization walls 53 formed of thermoplastic sheet, a tubing 54 for a tube 541 for venting to the open air and a tubing 55 for passage of a tube 551 connected to the fuel feed pump of the motor of the vehicle on which the tank is mounted, said tube being provided with a screen 552 mounted at the entrance of the sump 44.

FIGS. 8 to 13 show additional details. To avoid unnecessary description and repetition, only the thermoplastic sheet is shown, without the inclusion of the metal shells, used as molds, and the vacuum tubes. The vacuum tubes and their fittings which connect the tubes to the vacuum source also have been omitted. The different tubings are heat-formed grooves machined into the metal shells with the bottom of the tubings being milled or lathed. The mounting of the plastic tubes onto these tubes is achieved by methods known from prior art, such as welding or bonding with adhesive.

After separately heat-forming both members 3 and 4, as explained above, and after having proceeded with the machining of the details, the tubes 541 and 551 are introduced after having fastened the screen 552 which comprises a tapered top 5521 that facilitates the introduction of the tube 551. Both members are then brought together with contact first on the surface of the plastic joint 404–504, then, after welding or gluing, according to the latter, on the level of the metal joint 403–503, which is welded in turn.

This tank combines the advantages of the metal shell with those resulting from the presence of the thermoplastic coating, i.e., good mechanical characteristics (resistance to traction, compression, bending and singing), temperature resistance, thus easy evacuation of the heat, tightness with regard to gases, resistance to abrasion, ease of stamping under vacuum, sound and heat insulation, and resistance to corrosion.

When the metal shell is built of aluminum or an aluminum alloy, the entire tank assembly is of remarkable light weight.

Figure 14:
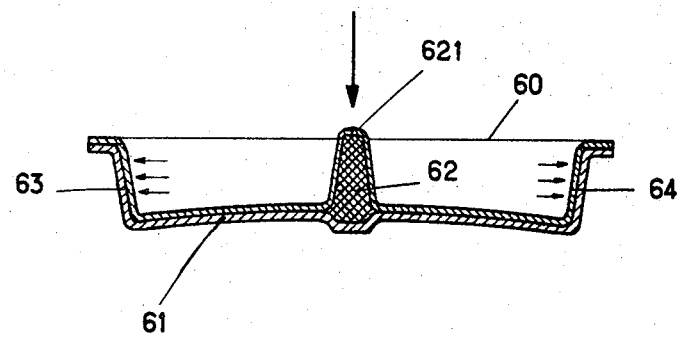
FIG. 14 is a sectional elevational view of a semi-tank in which the plastic sheet is improved by hooping.

According to an improvement illustrated in FIG. 14, the tank is formed, as explained above, by assembly of two members 6 and 7 with the open ends against each other. The bottom of each of these members is bent, as shown for the bottom 61 of the member 6, so as to be concave on the outside. In the central area of each of the members, a plot or wall, such as 62, is provided, the upper end 621 of which extends beyond the upper surface 60. When both members 6 and 7 are assembled, the upper end 621 comes in contact with the corresponding member of part 7, bringing about the exertion of a stress so that the assembly can be accomplished. The result is that the outer metal wall on the sidewalls 63 and 64 exerts a stress on the inner plastic sheet corresponding to a veritable hooping of the latter by the metal.

According to another method of the embodiment of the invention, the vacuum tube is formed of a mass of foamed plastic in which the pores communicate at least in the direction of the progression of the vacuum. This foam, obtained by grinding or cutting from larger blocks, can be reinforced by fibers, for example by non-flammable threads, glass fibers or wires.

Figure 15:
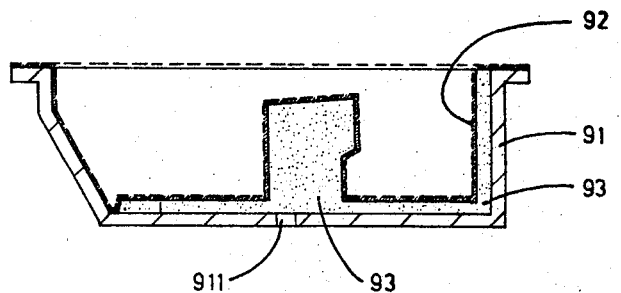
FIG. 15 is a sectional elevational view of a hollow body prepared in accordance with the practice of this invention in which the vacuum tube is in the form of a porous mass.
Figure 16:
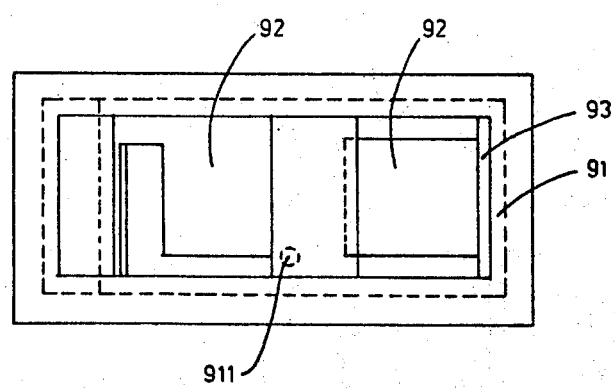
FIG. 16 is a plan view of the body shown in FIG. 15.

In the example shown in FIG. 15, a metal member 91 is double-walled by a thermoplastic sheet 92 deformed under the action of the vacuum originating from the passage 911 and transmitted through the porous foam network and interlayer 93. FIG. 16 illustrates how the sheet 92 can embrace even the most complicated details of the metal part, although the latter does not include a porous foam interlayer. The vacuum is established slowly and progressively, but its action on the thermoplastic sheet is complete. When the foam used includes a surface skin, it is suitable to effect the drilling of this skin mechanically to provide communication with the interior or body portion of the foam.

Figure 17:
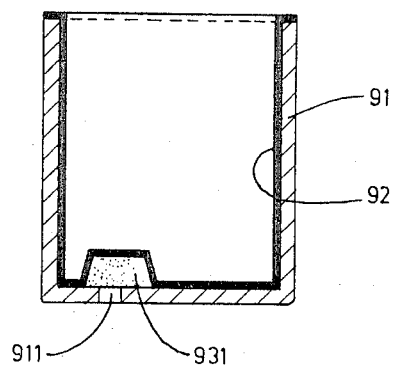
FIG. 17 is a sectional elevational view of another embodiment of a device embodying features of this invention.

In the example shown in FIG. 17, the porous foam takes up only a small space 931 in contact with the vacuum source 911. The thermoplastic sheet is in contact with the metal member 91, both in the distal zone of the foam 931 and in the proximal zone of this foam.

Figure 18:
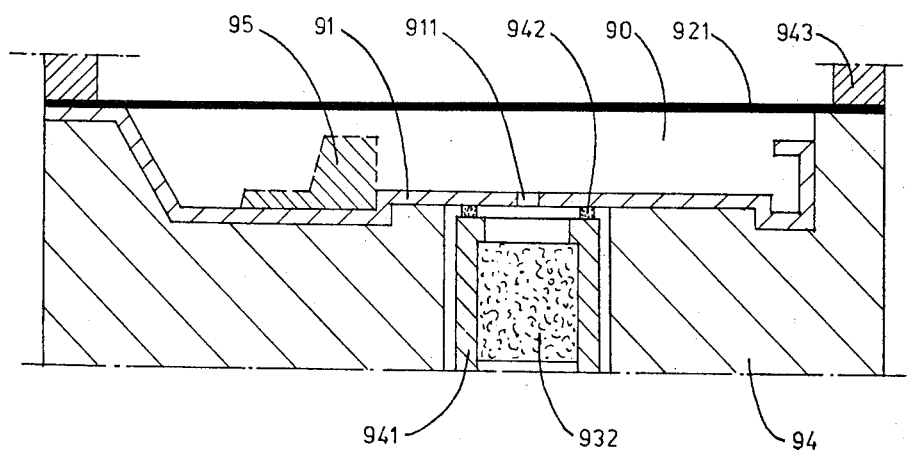
FIG. 18 is a sectional elevational view of a still further embodiment of this invention.

The porous mass may even be located outside the volume 90 present between the metal member 91 and the thermo-plastic sheet 921 prior to its deformation, as shown in FIG. 18. The metal member 91 is then placed to form a joint on a support 94 made of natural or synthetic rubber, for example, wherein, below the passage of the vacuum 911, an opening is provided in the member 91 receiving the porous mass 932, surrounded by a sleeve 941, and positioned against the member 91 by a joint 942. Inserts, such as 95, which may or may not be porous, may be placed into the space 90 to allow the sheet 921, after heat-shaping, to assume a shape different from that of the member 91. The sheet 921 is applied to the support 94 by means of a blankholder 943.

It will be apparent from the foregoing that there is provided a simple and efficient means and method for lining the interior surfaces of shaped metal members with thermoplastic sheet material and for joinder of such members to provide a fluid- and vapor-tight tank or container for the storage and transportation of liquids or vapors, such as a fuel tank or the like.

It will be understood that changes may be made in the details of construction and arrangement, without departing from the spirit of the invention, especially as defined in the following claims:

I claim:

1. In a method for manufacturing metal bodies internally lined with a thermoplastic material comprising the steps of first forming the metal body to the desired shape, positioning a sheet of thermoplastic material over the open end of the body to span the body and engage the edges, heating the thermoplastic material, and then forming the heated thermoplastic material by creating a vacuum in the space between the body and the sheet, the improvement wherein a foraminous vacuum tube is located on the body between the body and the plastic sheet, and the space therebetween is evacuated through said tube to deform the sheet onto the body with the tube entrapped therebetween to form a part of the assembly.

2. The method as claimed in claim 1 in which the vacuum tube comprises a tubular member with openings extending laterally through the walls thereof.

3. A method as claimed in claim 1 in which stampings are obtained by interpositioning at least one intermediate porous and permeable member in the desired location between the sheet and body and interconnecting said intermediate body into the vacuum tube circuit.

4. The method as claimed in claim 3 in which the intermediate bodies in the form of a block of heat-hardenable foam having interconnected pores.

5. The method as claimed in claim 3 in which the intermediate body is in the form of a drilled profile.

* * * * *